US009650506B2

(12) United States Patent
Pepers et al.

(10) Patent No.: US 9,650,506 B2
(45) Date of Patent: May 16, 2017

(54) THERMOPLASTIC MOULDING COMPOSITIONS FOR METAL PLATED ARTICLES WITH IMPROVED RESISTANCE AGAINST REPEATED IMPACT

(75) Inventors: Michel Pepers, Velden (NL); Christian Schade, Ludwigshafen (DE); Davy Roger Suwier, Bad Essen (DE); Norbert Niessner, Friedelsheim (DE)

(73) Assignee: INEOS STYROLUTION EUROPE GMBH (DE)

( * ) Notice: Subject to any disclaimer, the term of this patent is extended or adjusted under 35 U.S.C. 154(b) by 719 days.

(21) Appl. No.: 13/992,602

(22) PCT Filed: Dec. 15, 2011

(86) PCT No.: PCT/EP2011/072931
§ 371 (c)(1),
(2), (4) Date: Sep. 20, 2013

(87) PCT Pub. No.: WO2012/080407
PCT Pub. Date: Jun. 21, 2012

(65) Prior Publication Data
US 2014/0329100 A1 Nov. 6, 2014

(30) Foreign Application Priority Data

Dec. 16, 2010 (EP) ..................................... 10195314

(51) Int. Cl.
| | |
|---|---|
| C08L 51/00 | (2006.01) |
| C08L 25/12 | (2006.01) |
| C23C 18/16 | (2006.01) |
| C08L 25/10 | (2006.01) |
| C08L 21/00 | (2006.01) |
| C08L 55/02 | (2006.01) |
| C25D 5/56 | (2006.01) |
| C23C 18/31 | (2006.01) |
| C08L 9/00 | (2006.01) |
| C25D 5/14 | (2006.01) |

(52) U.S. Cl.
CPC .............. *C08L 25/12* (2013.01); *C08L 21/00* (2013.01); *C08L 25/10* (2013.01); *C08L 51/00* (2013.01); *C08L 55/02* (2013.01); *C23C 18/1601* (2013.01); *C23C 18/1641* (2013.01); *C23C 18/31* (2013.01); *C25D 5/56* (2013.01); *C08L 9/00* (2013.01); *C08L 2205/02* (2013.01); *C08L 2205/03* (2013.01); *C08L 2207/04* (2013.01); *C25D 5/14* (2013.01); *Y10T 428/31696* (2015.04)

(58) Field of Classification Search
CPC ...... C08L 25/10; C08L 55/00; C08L 2205/03; C08L 2205/02; C08L 2207/04; C23C 18/1601; C23C 18/31
See application file for complete search history.

(56) References Cited

U.S. PATENT DOCUMENTS

| | | |
|---|---|---|
| 3,169,121 A | 2/1965 | Goldberg |
| 3,264,272 A | 8/1966 | Watkin |
| 3,355,319 A | 11/1967 | Watkin |
| 3,404,134 A | 10/1968 | Watkin |
| 3,692,744 A | 9/1972 | Rich et al. |
| 4,010,147 A | 3/1977 | Rose |
| 4,148,945 A | 4/1979 | Bangs et al. |
| 4,176,224 A | 11/1979 | Bier et al. |
| 4,312,962 A | 1/1982 | Campbell et al. |
| 4,321,337 A | 3/1982 | Smith |

(Continued)

FOREIGN PATENT DOCUMENTS

| | | |
|---|---|---|
| DE | 1 260 135 B | 2/1968 |
| DE | 1 900 270 A1 | 11/1969 |

(Continued)

OTHER PUBLICATIONS

International Search Report of PCT International Application No. PCT/EP2011/072931, dated Mar. 1, 2012.
International Preliminary Report on Patentability of PCT International Application No. PCT/EP2011/072931, dated Apr. 11, 2013.
Kunststoff-Metallisierung, Plastic Metallization, Manual for Theory and Practical Application, pp. 45-47 (Eugen G. Leuze, Saulgau 1991).
Kunststoff-Handbuch, ed. R. Vieweg and G. Daumiller, vol. V "Polystyrol," pp. 122-124 (Carl-Hanser-Verlag, Munich 1969).

*Primary Examiner* — Peter D Mulcahy
(74) *Attorney, Agent, or Firm* — J.A. Lindeman & Co., PLLC

(57) ABSTRACT

Thermoplastic moulding composition (F), comprising: A) from 5 to 80% by weight of a graft polymer (A) having bimodal particle size distribution and a moisture content of 0 to 27% by weight, made, based on (A), $a_1$) from 40 to 90% by weight of an elastomeric particulate graft base ($a_1$), obtained by emulsion polymerization of, based on ($a_1$), $a_{11}$) from 70 to 100% by weight of at least one conjugated diene, or of at least one $C_{1-8}$-alkyl acrylate, or of mixtures of these, $a_{12}$) from 0 to 30% by weight of at least one other monoethylenically unsaturated monomer and $a_{13}$) from 0 to 10% by weight of at least one polyfunctional, cross linking monomer; $a_2$) from 10 to 60% by weight of a graft a2), made, based on a2), $a_{21}$) from 64 to 76% by weight of at least one vinyl aromatic monomer, $a_{22}$) from 24 to 36% by weight of acrylonitrile, $a_{23}$) from 0 to 30% by weight of at least one other monoethylenically unsaturated monomer, and $a_{24}$) from 0 to 10% by weight of at least one polyfunctional, cross linking monomer; B) from 10 to 94% by weight of a thermoplastic polymer (B) having a viscosity number VN of from 50 to 120 ml/g, made, based on (B), $b_1$) from 64 to 72% by weight of at least one vinyl aromatic monomer, $b_2$) from 28 to 36% by weight of acrylonitrile, and $b_3$) from 0 to 4% by weight of at least one other monoethylenically unsaturated monomer; whereby, the difference of the acrylonitrile content in component (B) and that in the graft shell $a_2$) is minimal 2% by weight and maximal 6% by weight and optionally further components, have preferred optical appearance when coated with metal.

17 Claims, No Drawings

(56) References Cited

U.S. PATENT DOCUMENTS

| | | | |
|---|---|---|---|
| 4,430,484 A | 2/1984 | Quinn | |
| 4,487,896 A | 12/1984 | Mark et al. | |
| 4,634,734 A | 1/1987 | Hambrecht et al. | |
| 4,837,296 A | 6/1989 | Heinz et al. | |
| 4,921,889 A | 5/1990 | Lausberg et al. | |
| 5,411,999 A | 5/1995 | Gallucci | |
| 5,955,540 A * | 9/1999 | Dion .................... | C08F 279/02 525/316 |

FOREIGN PATENT DOCUMENTS

| | | |
|---|---|---|
| DE | 2 407 647 A1 | 9/1974 |
| DE | 24 07 776 A1 | 9/1975 |
| DE | 27 15 932 A1 | 10/1978 |
| DE | 31 49 358 A1 | 6/1983 |
| DE | 197 28 629 A1 | 1/1999 |
| EP | 0 135 938 A2 | 4/1985 |
| EP | 0 165 406 A1 | 12/1985 |
| EP | 0 270 998 A2 | 6/1988 |
| EP | 0 275 035 A2 | 7/1988 |
| EP | 0 292 211 A2 | 11/1988 |
| EP | 0 616 053 A1 | 9/1994 |
| EP | 1 764 392 A1 | 3/2007 |
| EP | 1 956 043 A1 | 8/2008 |
| GB | 1078234 A | 8/1967 |
| GB | 1124911 A | 8/1968 |
| GB | 1425000 A | 2/1976 |
| WO | 99/65991 A1 | 12/1999 |
| WO | 00/61831 A1 | 10/2000 |
| WO | 03/018720 A2 | 3/2003 |

* cited by examiner

THERMOPLASTIC MOULDING COMPOSITIONS FOR METAL PLATED ARTICLES WITH IMPROVED RESISTANCE AGAINST REPEATED IMPACT

The invention relates to a thermoplastic moulding composition with improved metal plating properties, a process for producing this composition, mouldings produced from this composition, a process for metal plating such mouldings and metal plated mouldings produced from the composition.

Plastic parts are often coated with metal for decorative applications. Sanitary appliances, motorcar accessories, furniture fittings, fashion jewelry and buttons for example are metal plated either all over or in parts only in order to make them attractive. Plastic parts are also metal plated for functional reasons, housings of electrical appliances for example in order to achieve efficient shielding from emission or immission of electromagnetic radiation. Moreover, surface properties of plastic parts may be modified specifically by metallic coatings. In many cases, the copolymers used are made of acrylonitrile, butadiene and styrene and of blends thereof with other polymers such as polycarbonate, polyamides and polyolefines.

A widely used technique for the metal plating of plastics—in the current invention defined as the standard metal plating technique—can be described as follows. To produce metallic coatings on plastic parts, these are usually fastened onto racks and brought into contact with processing fluids in a determined sequence. For this purpose, the plastic parts are usually submitted first to a pretreatment in order to remove any contamination such as grease from the surfaces. Moreover, in most cases, etching processes are performed to roughen the surfaces so that efficient bonding to them is provided. Then, the surfaces are treated with so-called activators to form a catalytically active surface for subsequent electro-less metal plating.

For this purpose, so-called ionogenic activators or colloidal systems are utilized. In "Kunststoffmetallisierung" (Plastic Metallization, Manual for Theory and Practical Application, published by Eugen G. Leuze, SAULGAU, 1991, pages 46, 47), it is indicated that, for activation with ionogenic systems, the plastic surfaces are treated with stannous ions first, tightly adhering gels of hydrated stannic acid forming during the process of rinsing with water that takes place after treatment with stannous ions. During further treatment with a solution of a palladium salt, palladium nuclei form on the surfaces through reduction with tin (II)-species that function as catalysts for electroless metal plating.

For activation with colloidal systems, solutions of colloidal palladium are generally utilized that are formed by reaction of palladium chloride with stannous chloride in the presence of excess of hydrochloric acid (Annual Book of ASTM Standard, Vol. 02.05 "Metallic and Inorganic Coatings; Metal Powders, Sintered P/M Structural Parts", Designation: B727-83, Standard Practice for Preparation of Plastic Materials for Electroplating, 1995, pages 446-450). This standard metal plating process can be used for accomplishing the objectives of the current invention.

For plastics for which the standard technique described above does not result in the desired adhesion quality more specific procedures have been developed. For example, there are a wide variety of specific procedures for vacuum deposition of a thin surface coating of metal over a plastic, and an even wider variety of specific procedures for chemical deposition of such a coating.

It was found to be advantageous if the first metal coating on the items is applied by any of the known vacuum deposition procedures. Vacuum metallization or deposition is the deposition of a film or coating in a vacuum or low-pressure plasma environment. The term plasma generally refers to an ion- or electron-rich gaseous environment for providing appreciable electrical conductivity. Vacuum deposition is a term that is applied to processes that deposit atoms or molecules one at a time, such as in physical vapor deposition (PVD) or low-pressure chemical vapor deposition (LPCVD).

Typical PVD techniques can be used for accomplishing the objectives of the current invention. In physical vapor deposition or (PVD) processes metallic particles are vaporized from a solid or liquid source and transported as vapor through vacuum or low-pressure gaseous or plasma environment. The vaporized material can be an element, alloy or compound. The condensation of the particles produces a thin-metallic coating or film on the substrate surface and imparts a metallic look to the substrate. Film thickness ranges from few nanometers to thousands of nanometers. However, PVD processes can be used to form thick deposits through multilayer coatings. Various variants of the PVD processes have been described in the prior art including vacuum evaporation, sputter deposition or sputtering, arc vapor deposition and ion plating. Additional evaporation techniques include filament evaporation, flash evaporation, and electronbeam evaporation.

Sputtering is a PVD coating process which, is conducted in an evacuable coating or sputtering chamber. The source of the coating material, the target, is mounted opposite to the substrate items in the sputtering chamber which is then evacuated, generally in the range of 0.13332 to 13.332 Pa (1 to 100 mTorr) in the presence of an inert gas such as Argon. A negative DC or RF voltage is applied to the metal sputtering target (metal source), which is positioned inside the sputtering or coating chamber. A gas plasma or glow discharge is created between the metal target and the item or substrate to be coated.

Positively charged gas ions generated in the plasma region are propelled at high velocities towards the target (negative potential), resulting in the ejection of neutral atomic size particles of the metal target. Thus, sputtering is a non-thermal vaporization process where surface atoms are physically ejected from the metal source or target by momentum transfer or exchange from an energetic bombarding particle or gaseous ion accelerated from plasma.

A particular advantage of the sputtering technique is the ability for depositing metals as well as metal alloys and is well suited for depositing these to the used substrates.

Also, following the vacuum or chemical deposition steps, the desired thickness of a metal coating and/or the coating of additional metals can be obtained by a number of well known electroplating, or other techniques.

EP-A 0 616 053 describes a process for applying a metal coating to a non-conductive substrate without using electroless metal deposition. The substrate is first activated with a colloidal palladium/tin-activator and then treated with a solution that contains, among others, copper ions and a complexing agent for copper ions. Thereupon metal may be electrolytically deposited. The known methods have the disadvantage that the noble metal usually utilized to activate non-conductive surfaces is palladium. The method is very cost expensive, laborious and also from a standpoint of environmental aspects not attractive.

WO 2000/61831 describes a process for making decorative articles with metal surfaces comprising the steps of: a)

providing a polymeric substrate which is shaped to a desired form; and b) thermally spraying a low temperature metal on the substrate to form a decorative article having a metallic layer.

Depending on the article being formed, the polymeric substrate may be treated to modify the surface in order to promote adhesion prior to carrying out the thermal spraying step. Additionally, depending on the application, it may be desirable to apply a base coat to the substrate prior to thermal spraying. The surface modification step can involve any one of a number of different techniques including, for example, chemical etching, peening, or vapor blasting. A preferred surface modification technique involves wet or dry grit blasting that may utilize any of various media including, for example, aluminum oxide, silicon carbide, steel shot, ceramics, plastics, sand, glass beads, walnut shells, $CO_2$ pellets, and diamonds or diamond-like material.

WO 2003/018720 describes a method were physical vapor deposition is applied to a light-transmitting grade of a thermoplastic polymeric material. In the most preferred embodiment of this invention the metallic coating is applied to the plastic substrate by sputtering vacuum deposition (also referred to as sputter deposition or sputtering).

The adhesion between the substrate or the plastic article and the deposited metal layer can be enhanced by utilizing a volatiles free resin completely free of mineral oil and similar lubricants.

Another technique to improve adhesion of the metallic coating to the article is by utilizing a mixture of argon and nitrogen for plasma generation in the sputtering chamber during metal deposition. From the above examples it is clear that adhesion between the thermoplastic substrate and the metal layer is the object of many studies.

The thermoplastic polymer employed in U.S. Pat. No. 4,148,945 is a rubber modified unsaturated carboxylic acid or anhydride containing polymer which is prepared by polymerizing the monomers in the presence of the rubber in a finely divided form. The surface to be metallized is first aminated with aqueous hydroxylamine or hydrazine, then treated with a noble metal salt solution and thereafter treated with a reducing agent, as needed, to produce a metallized surface having a resistance of 100 ohms/sq. or less. The metallized surface can then be further plated by conventional means.

The said acid or anhydride content is from 12 to 30 weight percent. Disadvantages of this high content are the poor thermal stability of these kinds of polymers. Due to the high acid or anhydride contents, these polymers generate water and carbon dioxide during processing leading to poor surface quality (blisters, silver streaks).

According to the teachings of U.S. Pat. No. 4,312,962, the adhesion between a metal plating and a polymeric substrate comprising an ABS blended with a styrene/maleic anhydride polymer is greatly increased by incorporating into the substrate a $C_1$ to $C_6$ ester of a $C_{12}$ to $C_{20}$ fatty acid. However, also these blends contain copolymers with 20 to 30% maleic anhydride leading to poor surface quality. On the other hand the addition of substantial amounts of these esters of fatty acids will lead to decreased thermal properties (Vicat, HDT).

In WO1999/65991 a thermoplastic moulding composition containing a major amount of polycarbonate and a lesser amount of butadiene based graft polymer is disclosed. This composition is especially suited for the preparation of a molded article wherein at least some of its surface is metallized by an electroless plating process. Besides polycarbonate and two graft polymers, the blend contains from up to 30% by weight of a rubber free vinyl copolymer. One of the building blocks of this polymer can be maleic anhydride. However, no specific effect from this polymer is claimed or described.

One objective of the present invention is to provide a thermoplastic polymer especially suitable for metal plating resulting in metal plated finished articles having improved resistance against repeated impacts, while maintaining sufficient thermal stability, surface quality, superior adhesion between the substrate and the metal layer irrespective of the complexity of the design of the molded article and the kind of metal plating technique (e.g. conventional, electroless, physical vapour deposition, direct metal plating).

Extensive studies showed that this challenge can be solved if a thermoplastic moulding composition is produced from a graft copolymer (A) a thermoplastic polymer that has a moisture content of 0 to 27% by weight, preferably of 20 to 26% by weight, particularly of 23 to 26% by weight after work-up (B). On top of that, our studies have showed that this challenge is even better solved by additionally including a thermoplastic polymer (C) that is not, or only to a limited amount miscible with the thermoplastic polymer (B).

The thermoplastic polymer (C) contains from 1.2 to 3% by weight of at least one monoethylenically unsaturated monomer, like acrylic acid, methacrylic acid, or dicarboxylic acids, such as maleic acid and fumaric acid and their anhydrides, such as maleic anhydride. The vinyl aromatic content of component (C) is high than that of component (B).

In one aspect of the invention, a thermoplastic moulding composition (F) is provided, comprising (as components (A) to (E)), or consisting of:

A) from 5 to 80% by weight of a graft polymer (A) having bimodal particle size distribution and a moisture content of 0 to 27% by weight, made, based on (A), $a_1$) from 40 to 90% by weight of an elastomeric particulate graft base ($a_1$), obtained by emulsion polymerization of, based on ($a_1$), $a_{11}$) from 70 to 100% by weight of at least one conjugated diene, or of at least one $C_{1-8}$-alkyl acrylate, or of mixtures of these, $a_{12}$) from 0 to 30% by weight of at least one other monoethylenically unsaturated monomer and $a_{13}$) from 0 to 10% by weight of at least one polyfunctional, cross linking monomer.

$a_2$) from 10 to 60% by weight of a graft a2), made, based on a2), $a_{21}$) from 64 to 76% by weight of at least one vinyl aromatic monomer, $a_{22}$) from 24 to 36% by weight of acrylonitrile, $a_{23}$) from 0 to 30% by weight of at least one other monoethylenically unsaturated monomer, and $a_{24}$) from 0 to 10% by weight of at least one polyfunctional, cross linking monomer;

B) from 10 to 94% by weight of a thermoplastic polymer (B) having a viscosity number VN of from 50 to 120 ml/g, made, based on (B), $b_1$) from 64 to 72% by weight of at least one vinyl aromatic monomer, $b_2$) from 28 to 36% by weight of acrylonitrile, and $b_3$) from 0 to 4% by weight of at least one other monoethylenically unsaturated monomer;

whereby, the difference of the acrylonitrile content in component (B) and that in the graft shell $a_2$) is minimal 2% by weight and maximal 6% by weight, and optionally a component:
C) from 1.2 to 3% by weight of a thermoplastic polymer C) having a viscosity number VN of from 50 to 120 ml/g, made, based on (C),
  $c_1$) from 64 to 76% by weight of at least one vinyl aromatic monomer,
  $c_2$) from 17 to 35% by weight of acrylonitrile and
  $c_3$) from 1 to 10% by weight of at least one other monoethylenically unsaturated monomer, like acrylic acid, methacrylic acid, and also dicarboxylic acids, such as maleic acid and fumaric acid and their anhydrides, such as maleic anhydride,
  where the vinyl aromatic content of component (C) is higher than that of component (B);
and optionally a component:
D) from 0 to 80% by weight of amorphous or (semi)-crystalline polymers like polycondensation products, for example aromatic polycarbonates, aromatic polyester carbonates, polyesters, polyamides, as the rubber-free copolymer in the moulding compositions according to the invention, and
and optionally a component:
E) from 0 to 50% by weight of additives E.

In one aspect of the invention, the thermoplastic moulding composition (F) comprises the components (A), (B) and (C), and optionally (D) and (E) in the ratios described above. In another aspect of the invention, there is provided a process for producing a thermoplastic moulding composition (F) as described above by mixing components (A), (B) and (C), and, optionally, (D) and (E) in the ratios described above.

The invention also relates to a thermoplastic moulding composition (F) consisting of:
A) from 5 to 80% by weight of a graft polymer (A) having a bimodal particle size distribution and a moisture content of 0 to 27% by weight, made, based on (A),
  $a_1$) from 40 to 90% by weight of an elastomeric particulate graft base ($a_1$), obtained by emulsion polymerization of, based on ($a_1$),
    $a_{11}$) from 70 to 100% by weight of at least one conjugated diene, or of at least one $C_{1-8}$-alkyl acrylate, or of mixtures of these,
    $a_{12}$) from 0 to 30% by weight of at least one other monoethylenically unsaturated monomer and
    $a_{13}$) from 0 to 10% by weight of at least one polyfunctional, cross linking monomer.
  $a_2$) from 10 to 60% by weight of a graft $a_2$), made, based on $a_2$),
    $a_{21}$) from 64 to 76% by weight of at least one vinyl aromatic monomer,
    $a_{22}$) from 24 to 36% by weight of acrylonitrile,
    $a_{23}$) from 0 to 30% by weight of at least one other monoethylenically unsaturated monomer, and
    $a_{24}$) from 0 to 10% by weight of at least one polyfunctional, cross linking monomer;
B) from 10 to 94% by weight of a thermoplastic polymer (B) having a viscosity number VN of from 50 to 120 ml/g, made, based on (B),
  $b_1$) from 64 to 72% by weight of at least one vinyl aromatic monomer,
  $b_2$) from 28 to 36% by weight of acrylonitrile, and
  $b_3$) from 0 to 4% by weight of at least one other monoethylenically unsaturated monomer;
whereby the difference of the acrylonitrile content in component (B) and that in the graft shell $a_2$) is minimal 2% by weight and maximal 6% by weight, and
C) from 1.2 to 3% by weight of a thermoplastic polymer (C) having a viscosity number VN of from 50 to 120 ml/g, made, based on (C),
  $c_1$) from 64 to 76% by weight of at least one vinyl aromatic monomer,
  $c_2$) from 17 to 35% by weight of acrylonitrile and
  $c_3$) from 1 to 10% by weight of at least one other monoethylenically unsaturated monomer,
  where the vinyl aromatic content of component (C) is larger than that of component (B);
D) from 0 to 80% by weight of amorphous or (semi)-crystalline polymers; and
E) from 0 to 50% by weight of additives E.

The invention also relates to a thermoplastic moulding composition (F) consisting of:
A) from 10 to 70% by weight of a graft polymer (A) having a bimodal particle size distribution and a moisture content of 0 to 27% by weight, made, based on (A),
  $a_1$) from 40 to 90% by weight of an elastomeric particulate graft base ($a_1$), obtained by emulsion polymerization of, based on ($a_1$),
    $a_{11}$) from 70 to 100% by weight of at least one conjugated diene, or of at least one $C_{1-8}$-alkyl acrylate, or of mixtures of these,
    $a_{12}$) from 0 to 30% by weight of at least one other monoethylenically unsaturated monomer and
    $a_{13}$) from 0 to 10% by weight of at least one polyfunctional, cross linking monomer.
  $a_2$) from 10 to 60% by weight of a graft $a_2$), made, based on $a_2$),
    $a_{21}$) from 64 to 76% by weight of at least one vinyl aromatic monomer,
    $a_{22}$) from 24 to 36% by weight of acrylonitrile,
    $a_{23}$) from 0 to 30% by weight of at least one other monoethylenically unsaturated monomer, and
    $a_{24}$) from 0 to 10% by weight of at least one polyfunctional, cross linking monomer;
B) from 20 to 88% by weight of a thermoplastic polymer (B) having a viscosity number VN of from 50 to 120 ml/g, made, based on (B),
  $b_1$) from 64 to 72% by weight of at least one vinyl aromatic monomer,
  $b_2$) from 28 to 36% by weight of acrylonitrile, and
  $b_3$) from 0 to 4% by weight of at least one other monoethylenically unsaturated monomer;
whereby the difference of the acrylonitrile content in component (B) and that in the graft shell $a_2$) is minimal 2% by weight and maximal 6% by weight, and
C) from 1.2 to 3% by weight of a thermoplastic polymer (C) having a viscosity number VN of from 50 to 120 ml/g, made, based on (C),
  $c_1$) from 64 to 76% by weight of at least one vinyl aromatic monomer,
  $c_2$) from 17 to 35% by weight of acrylonitrile and
  $c_3$) from 1 to 10% by weight of at least one other monoethylenically unsaturated monomer,
  where the vinyl aromatic content of component (C) is larger than that of component (B);
D) from 0 to 80%, often from 0 to 50% by weight of amorphous or (semi)-crystalline polymers; and
E) from 0 to 50%, often from 0.2 to 30% by weight of additives E.

In a further aspect of the invention, there is provided a mold produced from a thermoplastic moulding composition (F) as described above. In a further aspect of the invention, there is provided the use of a thermoplastic moulding composition (F) as described above for producing metal plated mouldings. In a further aspect of the invention, there is provided the use of a mold produced from a thermoplastic moulding composition (F) as described above for producing metal plated mouldings.

A further aspect of the invention relates to a process for producing a metal plated moulding, comprising the steps of:
I. mixing components (A) to (C) and, optionally, (D) and (E) in the ratios described above,
II. processing the obtained thermoplastic moulding composition (F) into a mold having the desired form, and
III. coating the obtained mold with a metal.

In a further aspect of the invention, there is provided a metal coated moulding produced from a thermoplastic moulding composition (F) as described above.

The thermoplastic moulding compositions according to the invention results in a metal plated molded article using metal plating techniques and conditions widely used in industry that has an improved resistance against repeated impact strength, has sufficient thermal stability and surface quality and shows excellent adhesion between the substrate and the metal layer, regardless of the complexity of the article design.

Component (A)

Component (A) is a graft copolymer having bimodal particle size distribution and is present in the novel moulding compositions in a proportion of from 5 to 80% by weight, preferably from 10 to 70% by weight, particularly preferably from 15 to 60% by weight, based on the total components (A), (B) and (C), and if present, (D), and (E). The graft polymer (A) is built up from a "soft" elastomeric, particulate graft base ($a_1$) and a "hard" graft ($a_2$).

The graft base ($a_1$) is present in a proportion of from 40 to 90% by weight, preferably from 45 to 85% by weight, and particularly preferably from 50 to 80% by weight, based on component (A).

The graft base ($a_1$) is obtained by polymerizing, based on ($a_1$), $a_{11}$) from 70 to 100% by weight, preferably from 75 to 100% by weight, and particularly preferably from 80 to 100% by weight, of one conjugated diene, or of at least one $C_{1-8}$-alkyl acrylate, or of mixtures of these, $a_{12}$) from 0 to 30% by weight, preferably from 0 to 25% by weight, and particularly preferably from 0 to 20% by weight, of at least one other monoethylenically unsaturated monomer, $a_{13}$) from 0 to 10% by weight of at least one polyfunctional, cross linking monomer.

Examples of conjugated dienes ($a_{11}$) are butadiene, isoprene, chloroprene and mixtures of these. Preference is given to the use of butadiene or isoprene or mixtures of these, and butadiene is particularly preferred. Examples of $C_{1-8}$-alkyl acrylates ($a_{11}$) are, n-butyl acrylate and/or ethylhexyl acrylate, n-butylacrylate is particularly preferred.

Constituent ($a_1$) of the moulding compositions may also contain, with corresponding reduction in the monomers ($a_{11}$), other monomers ($a_{12}$) which vary the mechanical and thermal properties of the core within a certain range. Examples of such monoethylenically unsaturated comonomers are:

vinylaromatic monomers, such as styrene and styrene derivatives of the formula (I),

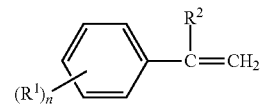

where $R^1$ and $R^2$ are hydrogen or $C_1$-$C_8$-alkyl and n is 0, 1, 2 or 3;

methacrylonitrile, acrylonitrile;

acrylic acid, methacrylic acid, and also dicarboxylic acids, such as maleic acid and fumaric acid and their anhydrides, such as maleic anhydride;

nitrogen-functional monomers, such as dimethylaminoethyl acrylate, diethylaminoethyl acrylate, vinylimidazole, vinylpyrrolidone, vinylcaprolactam, vinylcarbazole, vinylaniline, acrylamide;

$C_1$-$C_{10}$-alkylacrylates, such as methyl acrylate, ethyl acrylate, n-propyl acrylate, isopropyl acrylat, n-butyl acrylate, isobutyl acrylate, sec-butyl acrylate, tert-butyl acrylate, ethylhexyl acrylate, and the corresponding $C_1$-$C_{10}$-alkyl methacrylates, and hydroxyethyl acrylate;

aromatic and araliphatic (meth)acrylates, such as phenyl acrylate, phenyl methacrylate, benzyl acrylate, benzyl methacrylate, 2-phenylethyl acrylate, 2-phenylethyl methacrylate, 2-phenoxyethyl acrylate and 2-phenoxyethyl methacrylate;

N-substituted maleimides, such as N-methyl-, N-phenyl- and N-cyclohexylmaleimide;

unsaturated ethers, such as vinyl methyl ether;

and mixtures of these monomers.

Preferred monomers ($a_{12}$) are styrene, α-methylstyrene, n-butyl acrylate or mixtures of these, styrene and n-butyl acrylate or mixtures of these being particularly preferred and styrene being very particularly preferred. Styrene or n-butyl acrylate or mixtures of these are preferably used in amounts of, in total, up to 20% by weight, based on ($a_1$).

In principle, any cross linking monomer can be used as component ($a_{13}$).

Examples of polyfunctional cross linking monomers are divinylbenzene, diallyl maleate, diallyl fumarate, diallyl phthalate, diethyl phthalate, triallyl cyanurate, Wallyl isocyanurate, tricyclodecenyl acrylate, dihydrodicyclopentadienyl acrylate, Wallyl phosphate, allyl acrylate, and allyl methacrylate.

Dicyclopentadienyl acrylate (DCPA) has proven to be a particularly useful cross linking monomer.

In a particularly preferred embodiment, use is made of a graft base made from, based on ($a_1$), $a_{11}$) from 70 to 99.9, preferably from 90 to 99% by weight, of butadiene, and $a_{12}$) from 0.1 to 30, preferably from 1 to 10% by weight, of styrene.

The graft ($a_2$) is present in a proportion of from 10 to 60% by weight, preferably from 15 to 55% by weight, and particularly preferably from 20 to 50% by weight, based on component (A).

The graft ($a_2$) is obtained by polymerizing, based on ($a_2$), $a_{21}$) from 64 to 76% by weight, preferably from 70 to 76% by weight, and particularly preferably from 72 to 74% by weight, of at least one vinylaromatic monomer, $a_{22}$) from 24% to 36% by weight, preferably from 24 to 30% by weight, and particularly preferably from 26 to 28% by weight of acrylonitrile, $a_{23}$) from 0 to 30% by weight, preferably from 0 to 20% by weight, and particularly preferably to 0 to 15% by weight, of at least one further monoethylenically unsaturated monomer, and $a_{24}$) from 0 to 10%, preferably from 0 to 5%, more preferred from 0 to 2% by weight of at least one polyfunctional, cross linking monomer.

Examples of vinylaromatic monomers ($a_{21}$) can be styrene and styrene derivatives of the formula (I)

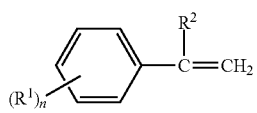

where $R^1$ and $R^2$ are hydrogen or $C_1$-$C_8$-alkyl and n is 0, 1, 2 or 3. Preference is given to the use of styrene, α-methyl styrene or mixtures thereof. Particularly preferred is styrene.

Examples of other monomers ($a_{23}$) are the monomers given above for component ($a_{12}$). Methyl methacrylate and acrylates, such as n-butyl acrylate, are particularly suitable. Methyl methacrylate (MMA) is very particularly suitable as monomer ($a_{23}$), an amount of up to 20% by weight of MMA, based on ($a_2$), being preferred.

In principle, any cross linking monomer can be used as component ($a_{24}$). Examples of polyfunctional cross linking monomers are divinylbenzene, diallyl maleate, diallyl fumarate, diallyl phthalate, diethyl phthalate, triallyl cyanurate, triallyl isocyanurate, tricyclodecenyl acrylate, dihydrodicyclopentadienyl acrylate, triallyl phosphate, allyl acrylate, and allyl methacrylate. Dicyclopentadienyl acrylate (DCPA) has proven to be a particularly useful cross linking monomer.

The graft polymers are generally prepared by emulsion polymerization, usually at from 20 to 100° C., preferably from 30 to 85° C. Additional use is usually made of customary emulsifiers, for example alkali metal salts of alkyl- or alkylarylsulfonic acids, alkyl sulfates, fatty alcohol sulfonates, salts of higher fatty acids having from 10 to 30 carbon atoms, sulfosuccinates, ether sulfonates or resin soaps. It is preferable to use the alkali metal salts, in particular the Na and K salts, of alkylsulfonates or fatty acids having from 10 to 18 carbon atoms.

The emulsifiers are generally used in amounts of from 0.5 to 5% by weight, in particular from 0.5 to 3% by weight, based on the monomers used in preparing the graft base ($a_1$).

In preparing the dispersion, it is preferable to use sufficient water to give the finished dispersion a solids content of from 20 to 50% by weight. A water/monomer ratio of from 2:1 to 0.7:1 is usually used.

Polymerization is generally carried out in the presence of a radical generating substance.

Suitable free-radical generators for initiating the polymerization are those which decompose at the selected reaction temperature, i.e. both those which decompose by themselves and those which do so in the presence of a redox system. Examples of preferred polymerization initiators are free-radical generators, such as peroxides, preferably peroxidisulfates (such as sodium or potassium) and azo compounds, such as azodiisobutyronitrile. It is also possible, however, to use redox systems, especially those based on hydroperoxides, such as cumene hydroperoxide.

The polymerization initiators are generally used in amounts of from 0.1 to 1% by weight, based on the graft base monomers ($a_{11}$) and ($a_{12}$).

In a preferred embodiment the polymerization initiators are inorganic peroxides, preferably peroxidisulfates (in particular sodium, potassium or ammonium peroxidisulfate).

In this preferred embodiment—to reduce the formation of odor generating substances—the use of azo compounds, such as azodiisobutyronitrile, or redox systems based on organic peroxides and/or hydroperoxides, such as cumene hydroperoxides, is excluded.

The free-radical generators and also the emulsifiers are added to the reaction mixture, for example, batchwise as a total amount at the beginning of the reaction or in stages, divided into a number of portions, at the beginning and at one or more later times, or continuously over a defined period. Continuous addition may also follow a gradient, which may, for example, rise or fall and be linear or exponential or even a step function.

It is also possible to include in the reaction molecular weight regulators, such as ethyl-hexyl thioglycolate, n-dodecyl or t-dodecyl mercaptane or other mercaptans, terpinols and dimeric α-methylstyrene or other compounds suitable for regulating molecular weight. The molecular weight regulators may be added to the reaction mixture batchwise or continuously, as described above for the free-radical generators and emulsifiers.

In a preferred embodiment use is made of one or more molecular weight regulators containing a mercapto group, such as alkyl mercaptanes, preferably ($C_6$-$C_{20}$)alkyl mercaptanes, such as n-dodecyl mercaptane and t-dodecyl mercaptane, or thioglycolates, such as esters or salts of thioglycolic acid, e.g. 2-ethyl-hexyl thioglycolate.

The use of n- or t-dodecyl mercaptane is particularly preferred.

In the preferred embodiment the amount of the molecular weight regulators is >0.5 and <1.2, more preferred >0.6 and <1.0 and most preferred >0.7 and <0.9% by weight based on monomers (a1).

To maintain a constant pH, preferably of from 6 to 9, it is possible for the reaction to include buffer substances such as $Na_2HPO_4$/$NaH_2PO_4$, sodium hydrogen carbonate or buffers based on citric acid/citrate. Regulators and buffer substances are used in the customary amounts, and further details on this point are, therefore, well known to those skilled in the art.

In a particularly preferred embodiment, a reductant is added during the grafting of the graft base ($a_1$) with the monomers ($a_{21}$) to ($a_{23}$).

In particular, it is possible to prepare the graft base by polymerizing the monomers ($a_1$) in the presence of a finely divided latex (the seed latex method of polymerization). This latex is the initial charge and may be made from monomers which form elastomeric polymers or else from other monomers mentioned above. Suitable seed latices are made from, for example, polybutadiene or polystyrene.

In another preferred embodiment, the graft base ($a_1$) is prepared by the feed method. In this process, the polymerization is initiated using a certain proportion of the monomers ($a_1$), and the remainder of the monomers ($a_1$) (the feed portion) is added as feed during the polymerization. The feed parameters (gradient shape, amount, duration, etc.) depend on the other polymerization conditions. The principles of the descriptions given in connection with the method of addition of the free-radical initiator and/or emulsifier are once again relevant here. In the feed process, the proportion of the monomers ($a_1$) in the initial charge is preferably from 5 to 50% by weight, particularly preferably from 8 to 40% by weight, based on ($a_1$). The feed portion of ($a_1$) is preferably fed in within a period of from 1 to 18 hours, in particular from 2 to 16 hours, very particularly from 4 to 12 hours.

Graft polymers having a number of "soft" and "hard" shells, e.g. of the structure $(a_1)$-$(a_2)$-$(a_1)$-$(a_2)$ or $(a_2)$-$(a_1)$-$(a_2)$, are also suitable, especially where the particles are of relatively large size.

The precise polymerization conditions, in particular the type, amount and method of addition of the emulsifier and of the other polymerization auxiliaries are preferably selected so that the resultant latex of the graft polymer (A) has a mean particle size, defined by the $d_{50}$ of the particle size distribution, of from 80 to 800, preferably from 80 to 600 and particularly preferably from 85 to 400.

The reaction conditions are preferably balanced so that the polymer particles have a bimodal particle size distribution, i.e. a particle size distribution having two maxima whose distinctness may vary. The first maximum is more distinct (peak comparatively narrow) than the second and is generally at from 25 to 200 nm, preferably from 60 to 170 nm and particularly preferably from 70 to 150 nm. The second maximum is broader in comparison and is generally at from 150 to 800 nm, preferably from 180 to 700, particularly preferably from 200 to 600 nm. The second maximum here (from 150 to 800 nm) is at larger particle sizes than the first maximum (from 25 to 200 nm).

The bimodal particle size distribution is preferably achieved by (partial) agglomeration of the polymer particles. This can be achieved, for example, by the following procedure: the monomers $(a_1)$, which form the core, are polymerized to a conversion of usually at least 90%, preferably greater than 95%, based on the monomers used. This conversion is generally achieved in from 4 to 20 hours. The resultant rubber latex has a mean particle size $d_{50}$ of not more than 200 nm and a narrow particle size distribution (virtually monodisperse system).

In the second step, the rubber latex is agglomerated. This is generally done by adding a dispersion of an acrylate polymer. Preference is given to the use of dispersions of copolymers of $C_1$-$C_4$-alkyl acrylates, preferably of ethyl acrylate, with from 0.1 to 10% by weight of monomers which form polar polymers, examples being acrylic acid, methacrylic acid, acrylamide, methacrylamide, N-methylol methacrylamide and N-vinylpyrrolidone. Particular preference is given to a composition of 95% to 97% of ethyl acrylate and 3% to 5% of methacrylamide. The agglomerating dispersion may, if desired, also contain more than one of the acrylate polymers mentioned.

In general, the concentration of the acrylate polymers in the dispersion used for agglomeration should be from 3 to 40% by weight. For the agglomeration, from 0.2 to 20 parts by weight, preferably from 1 to 5 parts by weight, of the agglomerating dispersion are used for each 100 parts of the rubber latex, the calculation in each case being based on solids. The agglomeration is carried out by adding the agglomerating dispersion to the rubber. The addition rate is usually not critical, and the addition usually takes from 1 to 30 minutes at from 20 to 90° C., preferably from 30 to 75° C.

Besides an acrylate polymer dispersion, use may also be made of other agglomerating agents, such as acetic anhydride, for agglomerating the rubber latex. Agglomeration by pressure or freezing is also possible. The methods mentioned are known to the person skilled in the art.

Under the conditions mentioned, the rubber latex is only partially agglomerated, giving a bimodal distribution. More than 50%, preferably from 75 to 95%, of the particles (distribution by volume) are generally in the agglomerated state after the agglomeration. The resultant partially agglomerated rubber latex is relatively stable, and it is therefore easy to store and transport it without coagulation occurring.

To achieve a bimodal particle size distribution of the graft polymer (A), it is also possible to prepare, separately from one another in the usual manner, two different graft polymers (A') and (A") differing in their mean particle size, and to mix the graft polymers (A') and (A") in the desired mixing ratio.

The polymerization of the graft base $(a_1)$ is usually carried out with reaction conditions selected to give a graft base having a particular cross linked nature. Examples of parameters which are important for this are the reaction temperature and duration, the ratio of monomers, regulator, free-radical initiator and, for example in the feed process, the feed rate and the amount and timing of addition of regulator and initiator.

One method for describing the cross linked nature of cross linked polymer particles is measurement of the swelling index QI, which is a measure of the solvent-swellability of a polymer having some degree of cross linking. Examples of customary swelling agents are methyl ethyl ketone and toluene. The QI of graft bases $(a_1)$ in the novel moulding compositions is usually in the range of from 5 to 60, preferably from 5 to 40 and particularly preferably from 5 to 15.

Another method for describing the extent of cross linking is the measurement of $T_2$ times, the NMR relaxation times of protons capable of movement. The more strongly cross linked a particular network is, the lower its $T_2$ times are. Customary average $T_2$ times for the graft bases $(a_1)$ according to the invention are in the range from 0.5 to 4.5 ms, preferably from 0.6 to 3.0 ms and particularly preferably from 0.65 to 2.5 ms, measured at 30° C. on specimens in film form. The average $T_2$ times can be composed of several components in the graft base with different $T_2$ times, typically for the graft bases $(a_1)$ according to the invention components having a $T_2$ time of 0.2 to 0.8 ms, 1 to 2 ms and 5 to 15 ms, respectively.

Gel content is another criterion for describing the graft base and its extent of cross linking, and is the proportion of material which is cross linked and therefore insoluble in a particular solvent. It is useful to determine the gel content in the solvent also used for determining the swelling index. Gel contents of the graft bases $(a_1)$ according to the invention are usually in the range from 50 to 90%, preferably from 55 to 85% and particularly preferably from 60 to 80%.

The following method may, for example, be used to determine the swelling index: about 0.2 g of the solid from a graft base dispersion converted to a film by evaporating the water is swollen in a sufficient quantity (e.g. 50 g) of toluene. After, for example, 24 h, the toluene is removed with suction and the specimen is weighed. The weighing is repeated after the specimen has been dried in vacuo. The swelling index is the ratio of the specimen weight after the swelling procedure to the dry specimen weight after the second drying. The gel content is calculated correspondingly from the ratio of the dry weight after the swelling step to the weight of the specimen before the swelling step (×100%)

The $T_2$ time is determined by measuring the NMR relaxation of a specimen of the graft base dispersion from which water has been removed and which has been converted into a film. For this, the specimen is, for example, dried in air overnight, at 60° C. for 3 h in vacuo and then studied at 30° C. using a suitable measuring apparatus, e.g. Bruker minispec. It is only possible to compare specimens studied by the same method, since the relaxation is markedly temperature-dependent.

The graft ($a_2$) may be prepared under the same conditions as those used for preparation of the graft base ($a_1$) and may be prepared in one or more process steps, for example in two steps of different monomer make up. In two-stage grafting, for example, it is possible to polymerize styrene and/or α-methylstyrene alone, and then styrene and acrylonitrile, in two sequential steps. Further details concerning the preparation of the graft polymers ($a_2$) are given in DE 12 60 135 and DE 31 49 358.

It is advantageous in turn to carry out the graft polymerization onto the graft base ($a_1$) in aqueous emulsion. It may be undertaken in the same system used for polymerizing the graft base, and further emulsifier and initiator may be added. These need not be identical with the emulsifiers and/or initiators used for preparing the graft base ($a_1$).

For example, it may be expedient to use a persulfate as initiator for preparing the graft base ($a_1$) but a redox initiator system for polymerizing the graft shell ($a_2$). Otherwise, that which was said for the preparation of the graft base ($a_1$) is applicable to the selection of emulsifier, initiator and polymerization auxiliaries.

The monomer mixture to be grafted on may be added to the reaction mixture all at once, in portions in more than one step- or, preferably, continuously during the polymerization.

In a preferred embodiment initiators which are preferred in the preparation of ($a_1$) are used and no molecular weight regulators are used in the preparation of ($a_2$).

If non-grafted polymers are produced from the monomers ($a_2$) during the grafting of the graft base ($a_1$), the amounts, which are generally less than 10% by weight of ($a_2$), are attributed to the weight of component (A).

Component (B)

Component (B) is a thermoplastic polymer and is present in the novel moulding compositions in a proportion of from 10 to 94% by weight, preferably from 20 to 88% by weight and particularly preferably from 30 to 83% by weight, based on the total of components (A), (B) and (C), and, if present, (D) and (E).

Component (B) is obtained by polymerizing, based on (B)
$b_1$) from 64 to 72% by weight, of at least one vinylaromatic monomer
$b_2$) from 28 to 36% by weight, of acrylonitrile
$b_3$) from 0 to 4% by weight, preferably from 0 to 2% by weight, of at least one other monoethylenically unsaturated monomer.

Suitable vinylaromatic monomers ($b_1$) are styrene and styrene derivatives of the formula (I) as described for component ($a_{21}$). Preference is given to the use of styrene and/or α-methylstyrene, or mixtures thereof.

In a preferred embodiment,
the graft ($a_2$) of the graft polymer (A) consists essentially of, based on (A),
$a_{21}$) from 72 to 76% by weight of styrene and/or α-methylstyrene
$a_{22}$) from 24% to 28% by weight of acrylonitrile,
and the thermoplastic polymer (B) consists essentially of, based on (B),
$b_1$) from 66 to 70% by weight of styrene, and
$b_2$) from 30% to 34% by weight of acrylonitrile.

In a particular embodiment, component (B) consists of two polymers (B') and (B").

The polymer (B') here corresponds to the polymer (B) described above, where the vinylaromatic monomers ($b_{1'}$) are only those of the formula (I) which have $R^1$ and $R^2$ as hydrogen, i.e. nonalkylated vinylaromatics. Styrene is preferred as monomer ($b_{1'}$) in (B').

The polymer (B") corresponds to the polymer (B) described above, where the vinylaromatic polymers ($b_{1''}$) are only those of the formula (I) which have $R^1$ and $R^2$ as $C_1$-$C_8$-alkyl, i.e. alkylated vinylaromatics. α-methylstyrene is preferred as monomer ($b_{1''}$) in (B").

Polymer (B") is preferably an α-methylstyrene-acrylonitrile copolymer. If component (B) comprises two components (B') and (B"''), it particularly preferably consists of a styrene-acrylonitrile copolymer (B') and an α-methylstyrene-acrylonitrile polymer (B").

If (B) consists of (B') and (B"), the ratio (B')/(B") is preferably from 99:1 to 1:99, preferably from 95:5 to 5:95.

The other monomers ($b_3$) may be the monomers mentioned earlier for component ($a_{12}$). Particularly suitable monomers are methyl methacrylate and N-alkyl- and/or N-arylmaleimides such as N-phenylmaleimide.

The polymers (B), which due to their main components styrene and acrylonitrile are generally also referred to as SAN polymers, are known and in some cases also commercially available.

Component (B) has a viscosity number VN (determined according to DIN 53 726 at 25° C. on a 0.5% strength by weight solution of component (B) in dimethylformamide) of from 50 to 120 ml/g, preferably from 52 to 110 ml/g and particularly preferably from 55 to 105 ml/g. It is obtained in a known manner by bulk, solution, suspension or precipitation polymerization, bulk and solution polymerization being preferred. Details of these processes are described, for example, in Kunststoffhandbuch, ed. R. Vieweg and G. Daumiller, Vol. V "Polystyrol", Carl-Hanser-Verlag Munich, 1969, p. 118 ff.

Component (C)

Component (C) is likewise a thermoplastic polymer and is present in the novel moulding compositions in a proportion of from 1.2 to 3% by weight, such as 1.2, 1.25, 1.3, 1.35, 1.4, 1.45, 1.5, 1.55, 1.6, 1.65, 1.7, 1.75, 1.8, 1.85, 1.9, 1.95, 2, 2.05, 2.05, 2.1, 2.15, 2.2, 2.25, 2.3, 2.35, 2.4, 2.45, 2.5, 2.55, 2.6, 2.65, 2.7, 2.75, 2.8, 2.85, 2.9, 2.95, 3, preferably 1.7, 1.75, 1.8, 1.85, 1.9, 1.95, 2, 2.05, 2.05, 2.1, 2.15, 2.2, 2.25, 2.3, 2.35, 2.4, 2.45, 2.5 and particularly preferably 2.1% by weight, based on the total of components (A), (B) and (C), and, if present, (D), and (E).

Component (C) is obtained by polymerizing, based on (C),
$c_1$) from 64 to 76% by weight, of at least one vinylaromatic monomer,
$c_2$) from 17 to 35% by weight, of acrylonitrile, and
$c_3$) from 1 to 10% by weight, preferably from 2 to 5% by weight, of at least one other monoethylenically unsaturated monomer like acrylic acid, methacrylic acid, and also dicarboxylic acids, such as maleic acid and fumaric acid and their anhydrides, such as maleic anhydride.

Suitable vinylaromatic monomers ($c_1$) are styrene and styrene derivatives of the formula (I), as described for component ($a_{21}$). The use of styrene, α-methyl styrene and mixtures thereof is preferred. Styrene is particularly preferred. The other monomers ($c_3$) are monoethylenically unsaturated monomer like acrylic acid, methacrylic acid, and also dicarboxylic acids, such as maleic acid and fumaric acid and their anhydrides, such as maleic anhydride. Particularly suitable monomers are acrylic acid and maleic anhydride. Most preferred is maleic anhydride.

The vinyl aromatic content of component (C) is higher than that of the vinyl aromatic content of component (B).

Component (C) has a viscosity number VN of from 10 to 120 ml/g, preferably from 20 to 100 ml/g and particularly preferably from 50 to 80 ml/g (determined as for component (B) according to DIN 53276). It is obtained in a known manner by bulk, solution, suspension or precipitation polymerization, bulk and solution polymerization being preferred. Details of these processes are given, for example, in Kunststoffhandbuch (Ed. R. Vieweg and G. Daumiller, Vol. V "Polystyrol", Carl-Hanser-Verlag Munich, 1969, p. 118 ff).

Examples of Component (D):

In addition to thermoplastic resins composed of vinyl monomers, it is also possible to use polycondensation products, for example aromatic polycarbonates, aromatic polyester carbonates, polyesters, polyamides, as the rubber-free copolymer in the moulding compositions according to the invention. The polycondensation product-component (D) is used in an amount of 0 to 80%, often 0 to 50%, in some cases from 0 to 30% by weight (of the total thermoplastic moulding composition.

Aromatic polycarbonate resins suitable for use as the polycarbonate resin component of the thermoplastic resin composition of the present invention are known compounds, whose preparation and properties have been described, see, generally, U.S. Pat. No. 3,169,121, U.S. Pat. No. 4,487,896 and U.S. Pat. No. 5,411,999. Suitable aromatic polycarbonate resins include linear aromatic polycarbonate resins, branched aromatic polycarbonate resins. Suitable linear aromatic polycarbonates resins include, e.g., bisphenol A polycarbonate resin.

Suitable branched polycarbonates are known and are made by reacting a polyfunctional aromatic compound with a dihydric phenol and a carbonate precursor to form a branched polymer, see generally, U.S. Pat. No. 3,544,514, U.S. Pat. No. 3,635,895 and U.S. Pat. No. 4,001,184. The polyfunctional compounds are generally aromatic and contain at least three functional groups which are carboxyl, carboxylic anhydrides, phenols, haloformates or mixtures thereof, such as, for example, 1,1,1-tri(4-hydroxyphenyl) ethane, 1,3,5-trihydroxybenzene, trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenone-tetracarboxylic dianhydride. The preferred polyfunctional aromatic compounds are 1,1,1-tri(4-hydroxyphenyl)ethane, trimellitic anhydride or trimellitic acid or their haloformate derivatives.

Copolyester-carbonate resins are also suitable for use as the aromatic polycarbonate resin component of the present invention. Copolyester-carbonate resins suitable for use as the aromatic polycarbonate resin component of the thermoplastic resin composition of the present invention are known compounds, whose preparation and properties have been described, see, generally, U.S. Pat. No. 3,169,121, U.S. Pat. No. 4,430,484 and U.S. Pat. No. 4,487,896.

The polycarbonates or polyester carbonates that are suitable may contain aromatically bonded halogen, preferably bromine and/or chlorine; preferably, they are halogen-free.

They have molecular weights ($M_W$, weight-average), determined, for example, by ultracentrifugation or scattered light measurement, of from 10,000 to 200,000, preferably from 20,000 to 80,000.

Suitable thermoplastic polyesters are preferably polyalkylene terephthalates, that is to say reaction products of aromatic dicarboxylic acids or reactive derivatives thereof (e.g. dimethyl esters or anhydrides) and aliphatic, cycloaliphatic or arylaliphatic diols, and mixtures of such reaction products.

Preferred polyalkylene terephthalates may be prepared from terephthalic acids (or reactive derivatives thereof) and aliphatic or cycloaliphatic diols having from 2 to 10 carbon atoms according to known methods (Kunststoff-Handbuch, Volume VIII, p. 695 ff, Carl Hanser Verlag, Munich 1973).

In preferred polyalkylene terephthalates, from 80 to 100 mol %, preferably from 90 to 100 mol %, of the dicarboxylic acid radicals are terephthalic acid radicals, and from 80 to 100 mol %, preferably from 90 to 100 mol %, of the diol radicals are ethylene glycol and/or 1,4-butanediol radicals. The preferred polyalkylene terephthalates may contain, in addition to ethylene glycol or 1,4-butanediol radicals, from 0 to 20 mol % of radicals of other aliphatic diols having from 3 to 12 carbon atoms or cycloaliphatic diols having from 6 to 12 carbon atoms, for example radicals of 1,3-propanediol, 2-ethyl-1,3-propanediol, neopentyl glycol, 1,5-pentanediol, 1,6-hexanediol, 1,4-cyclohexanedimethanol, 3-methyl-1,3- and -1,6-pentanediol, 2-ethyl-1,3-hexanediol, 2,2-diethyl-1, 3-propanediol, 2,5-hexanediol, 1,4-di(β-hydroxyethoxy)-benzene, 2,2(bis-4-hydroxycyclohexyl)-propane, 2,4-dihydroxy-1,1,3,3-tetramethylcyclobutane, 2,2-bis-(3-β-hydroxyethoxyphenyl)-propane and 2,2-bis-(4-hydroxypropoxyphenyl)-propane (DE-A 2 407 647, DE-A 2 407 776, DE-A 2 715 932).

The polyalkylene terephthalates may be branched by incorporation of relatively small amounts of tri- or tetrahydric alcohols or tri- or tetra-basic carboxylic acids, such as are described in DE-A 1 900 270 and U.S. Pat. No. 3,692,744. Examples of preferred branching agents are trimesic acid, trimellitic acid, trimethylol-ethane and -propane and pentaerythritol. It is advisable to use not more than 1 mol % of the branching agent, based on the acid component.

Particular preference is given to polyalkylene terephthalates that have been prepared solely from terephthalic acid and reactive derivatives thereof (e.g. dialkyl esters thereof) and ethylene glycol and/or 1,4-butanediol, and mixtures of such polyalkylene terephthalates.

Preferred polyalkylene terephthalates are also copolyesters prepared from at least two of the above-mentioned alcohol components: particularly preferred copolyesters are poly-(ethylene glycol 1,4-butanediol) terephthalates.

The polyalkylene terephthalates that are preferably suitable generally have an intrinsic viscosity of from 0.4 to 1.5 dl/g, preferably from 0.5 to 1.3 dl/g, especially from 0.6 to 1.2 dl/g, in each case measured in phenol/o-dichlorobenzene (1:1 parts by weight) at 25° C.

Suitable polyamides are known homopolyamides, copolyamides and mixtures of such polyamides. They may be semi-crystalline and/or amorphous polyamides. Suitable semi-crystalline polyamides are polyamide-6, polyamide-6,6, mixtures and corresponding copolymers of those components. Also included are semi-crystalline polyamides the acid component of which consists wholly or partially of terephthalic acid and/or isophthalic acid and/or suberic acid and/or sebacic acid and/or azelaic acid and/or adipic acid and/or cyclohexanedicarboxylic acid, the diamine component of which consists wholly or partially of m- and/or p-xylylene-diamine and/or hexamethylenediamine and/or 2,2,4-trimethylhexamethylenediamine and/or 2,2,4-trimethylhexamethylenediamine and/or isophoronediamine, and the composition of which is in principle known.

Mention may also be made of polyamides that are prepared wholly or partially from lactams having from 7 to 12 carbon atoms in the ring, optionally with the concomitant use of one or more of the above-mentioned starting components.

Particularly preferred semi-crystalline polyamides are polyamide-6 and polyamide-6,6 and mixtures thereof. Known products may be used as amorphous polyamides. They are obtained by polycondensation of diamines, such as ethylenediamine, hexamethylenediamine, decamethylenediamine, 2,2,4- and/or 2,4,4-trimethylhexa-methylenediamine, m- and/or p-xylylene-diamine, bis-(4-aminocyclohexyl)-methane, bis-(4-aminocyclohexyl)-propane, 3,3'-dimethyl-4,4'-diamino-dicyclohexylmethane, 3-aminomethyl-3,5,5-trimethylcyclohexylamine, 2,5- and/or 2,6-bis(aminomethyl)-norbornane and/or 1,4-diaminomethylcyclohexane, with dicarboxylic acids such as oxalic acid, adipic acid, azelaic acid, azelaic acid, decanedicarboxylic acid, heptadecanedicarboxylic acid, 2,2,4- and/or 2,4,4-trimethyladipic acid, isophthalic acid and terephthalic acid.

Also suitable are copolymers obtained by polycondensation of a plurality of monomers, as well as copolymers prepared with the addition of aminocarboxylic acids such as $\epsilon$-aminocaproic acid, $\omega$-aminoundecanoic acid or $\omega$-aminolauric acid or their lactams.

Particularly suitable amorphous polyamides are the polyamides prepared from isophthalic acid, hexamethylenediamine and further diamines such as 4,4'-diaminodicyclohexylmethane, isophoronediamine, 2,2,4- and/or 2,4,4-trimethylhexamethylenediamine, 2,5- and/or 2,6-bis (aminomethyl)-norbornene; or from isophthalic acid, 4,4'-diamino-dicyclohexylmethane and $\epsilon$-caprolactam; or from isophthalic acid, 3,3'-dimethyl-4,4'-diamino-dicyclohexylmethane and laurinlactam; or from terephthalic acid and the isomeric mixture of 2,2,4- and/or 2,4,4-trimethylhexamethylenediamine.

Instead of pure 4,4'-diaminodicyclohexylmethane it is also possible to use mixtures of the position-isomeric diaminodicyclohexylmethanes, which are composed of from 70 to 99 mol % of the 4,4'-diamino isomer from 1 to 30 mol % of the 2,4'-diamino isomer from 0 to 2 mol % of the 2,2'-diamino isomer and optionally corresponding to more highly condensed diamines, which are obtained by hydrogenation of industrial grade diaminodiphenylmethane. Up to 30% of the isophthalic acid may be replaced by terephthalic acid.

The polyamides preferably have a relative viscosity (measured on a 1 wt. % solution in m-cresol at 25° C. of from 2.0 to 5.0, particularly preferably from 2.5 to 4.0.

Examples of other polymers suitable as component (D) of the moulding compositions used according to the invention are partly crystalline polyolefins, preferably homo- and copolymers of olefins such as ethylene, propylene, 1-butene, 1-pentene, 1-hexene, 1-heptene, 3-methyl-1-butene, 4-methyl-1-butene, 4-methyl-1-pentene and 1-octene. Suitable polyolefins are polyethylene, polypropylene, poly-1-butene and poly-4-methyl-1-pentene. Under polyethylene (PE) a distinction is made in general between high-density PE (HDPE), low-density PE (LDFE) and linear low-density PE (LLDPE).

In another embodiment of the invention ionomers are component (D). These are generally polyolefins as described above, in particular polyethylene, which comprise copolymerized monomers with acid groups, e.g. acrylic acid, methacrylic acid and, where appropriate, other copolymerizable monomers. The acid groups are generally converted with the aid of metal ions, such as $Na^+$, $Ca^{2+}$, $Mg^{2+}$ and $Al^{3+}$ into ionic, where appropriate ionically cross linked, polyolefins which, however, can still be processed thermoplastically (see, for example, U.S. Pat. No. 3,264,272; U.S. Pat. No. 3,404,134; U.S. Pat. No. 3,355,319 and U.S. Pat. No. 4,321,337). However, the conversion of the polyolefins containing acid groups by the use of metal ions is not essential. Polyolefins containing free acid groups are also suitable as component (D) according to the invention. These then generally have rubbery character and to some extent comprise yet other copolymerizable monomers, e.g. (meth) acrylates.

Polyether ketones, for example as described in the publications GB 1 078 234, U.S. Pat. No. 4,010,147, EP-A 0 135 938, EP-A 0 292 211, EP-A 0 275 035, EP-A 0270 998 and EP-A 0 165 406, and in the publication by C. K. Sham et al., Polymer 29/6, (1988), 1016-1020, may also be used as component (D).

Polyoxyalkylenes, e.g. polyoxymethylene, and oxymethylene polymers may also be used as component (D) of the moulding compositions.

Other polymers suitable as component (D) are polyarylene sulfides, in particular polyphenylene sulfide.

Component (E):

Component (E) consists of additives which are present in the novel thermoplastic moulding compositions in a proportion of from 0 to 50% by weight, preferably from 0.1 to 45% by weight and particularly preferably from 0.2 to 30% by weight, based on the total of components (A), (B), (C), and (D) and (E) if they are present.

Component (E) includes lubricants or mold-release agents, waxes, pigments, dyes, flame retardants, antioxidants, stabilizers to counter the action of light, fibrous and pulverulent fillers, fibrous and pulverulent reinforcing agents, antistats and other additives, or mixtures of these.

Representative examples of the lubricants include metal soap, such as calcium stearate, magnesium stearate, zinc stearate, and lithium stearate, ethylene-bis-stearamide, methylene-bis-stearamide, palmityl amide, butyl stearate, palmityl stearate, polyglycerol tristearate, n-docosanoic acid, stearic acid, polyethylene-polypropylene wax, octacosanoic acid wax, Carnauba wax, montan waxes and petroleum wax. The amount of the lubricants is generally 0.03 to 5.0 wt %, based on the total amount of the rubber-modified styrenic resin composition.

Examples of pigments are titanium dioxide, phthalocyanines, ultramarine blue, iron oxides and carbon black, and the entire class of organic pigments.

For the purposes of the invention, dyes are all dyes which can be used for the transparent, semitransparent or non-transparent coloration of polymers, in particular those which are suitable for coloration of styrene copolymers. Dyes of this type are known to the person skilled in the art.

Representative examples of the flame retardant or its synergistic additives include decabromodiphenyl ether, tetrabromo-bisphenol A, brominated-polystyrene oligomer, bromoepoxy resin, hexabromocyclododecane, chloropolyethylene, triphenyl phosphate, red phosphorous, antimony oxide, aluminium hydroxide, magnesium hydroxide, zinc borate, melamine-isocyanate, phenol resin, silicone resin, polytetrafluoroethylene and expanding graphite.

Particularly suitable antioxidants are sterically hindered mono- or polynuclear phenolic antioxidants, which may be substituted in various ways and also bridged via substituents. These include not only monomeric but also oligomeric compounds, which may be built up from more than one fundamental phenol unit. Hydroquinones and substituted compounds which are hydroquinone analogs are also suitable, as are antioxidants based on tocopherols and their derivatives. Mixtures of different antioxidants may also be used. Examples of the antioxidants are phenolic antioxidants, thio-ether anti-oxidants, phosphorous-based antioxidants and chelating agents. The phenolic antioxidants are preferably added in an amount of 0.005 to 2.0 wt %. Representative examples of the phenolic antioxidants include octadecyl(3,5-di-tert-butyl-4-hydroxyphenyl) propionate, tri-ethylene glycol-bis-3-(3-tert-butyl-5-methyl-4-hydroxyphenyl)propionate, pentaerythritol-tetrakis-3-(3,5-di-tert-butyl-4-hydroxyphenyl) propionate, 2-tert-butyl-6-(3-tert-butyl-2-hydroxy-6-methylbenzyl)-4-methy phenyl acrylate, 2,2'-methylene-bis-(4-methyl-6-tert-butyl phenol), butylated reaction product of p-cresol and dicyclopentadiene, 2,2'-thio-bis-(4-methyl-6-tert-butyl phenol), 2,2'-thiodiethylene-bis[3-(3,5-di-tert-butyl-4-hydroxy-phenyl) propionate], and 2,2'-ethylene diamide-bis[ethyl-3-(3,5-di-tert-butyl-4-hydroxy-phenyl) propionate].

In principle, it is possible to use any compound which is commercially available or suitable for styrene copolymers, such as Topanol® (Rutherford Chemicals, Bayonne, N.J., USA), Irganox® (BASF, Basel, Switzerland) or Wingstay® (Eliokem, Villejust, France).

Alongside the phenolic antioxidants mentioned as examples above, it is possible to use co stabilizers, in particular phosphorus- or sulphur-containing co stabilizers.

The thio-ether antioxidants are preferably added in an amount of 0.005 to 2.0 wt %. The phosphorous-based antioxidants include phosphite, phosphate, phosphonite and phosphonate anti-oxidants. The phosphorous-based antioxidants are preferably added in an amount of 0.015 to 2.0 wt %. Representative examples of the phosphorous antioxidants are tris(nonylphenyl)phosphite, tris(2,4-di-t-butylphenyl)phosphite, triisodecyl phosphite, distearyl pentaerithritol diphosphite, triphenyl phosphite, diphenyl isodecyl phosphite, tris(isotridecyl)phosphite, tetraphenyl dipropylene glycol, diphosphite, distearyl hydrogen phosphite, diphenyl phenyl phosphonate, tetrakis(2,4-di-tert-butyl phenyl)4,4'-biphenylene di phosphonite.

Representative examples of the thio-ether antioxidants include distearyl thio-dipropionate, dipalmityl thio-dipropionate, dilauryl thio-dipropionate, pentaerythritol-tetrakis-(β-dodecylmethylthiopropionate) and dioctadecyl thioether.

Such phosphorus- or sulphur-containing co stabilizers are known to the person skilled in the art and are commercially available.

Representative examples of the heat stabilizer include dibutyl tin maleate and basic magnesium aluminium hydroxy carbonate. A low molecular styrene-maleic anhydride copolymer can also serve as a hear stabilizer to prevent thermal discoloring. The amount of the heat stabilizer is in generally 0.1 to 1.0 wt %, based on the total amount of the rubber modified styrenic resin composition.

Examples of suitable stabilizers to counter the action of light are various substituted resorcinols, salicylates, benzotriazoles, benzophenones and HALS (hindered amine light stabilizers), commercially available, for example, as Tinuvin® (Ciba Specialty Chemicals, Basel, Switzerland). The amount of the preceding additives is generally 0.02 to 2.0 wt % based on the total amount of the rubber-modified styrenic resin composition.

Examples of fibrous and/or particulate fillers are carbon fibers or glass fibers in the form of glass fabrics, glass mats or glass fiber rovings, chopped glass or glass beads, and wollastonite, particularly preferably glass fibers. If glass fibers are used, these may be provided with a size and a coupling agent for better compatibility with the blend components. The glass fibers may be incorporated either in the form of short glass fibers or in the form of continuous strands (rovings).

Suitable particulate fillers are carbon black, amorphous silicic acid, magnesium carbonate, chalk, powdered quartz, mica, bentonites, talc, feldspar or in particular calcium silicates, such as wollastonite, and kaolin.

Chelating agents can preferably be added in an amount of 0.001 to 2.0 wt %. Representative examples of the chelating agent include 2,2'-oxamido-bis-[ethyl 3-(3,5-di-tert-butyl-4-hydroxyphenyl)propionate], the sodium salt of ethylene diamine tetra acetic acid, amino tri(methylene phosphonic acid), 1-hydroxy ethylidene(1,1-diphosphonic acid), ethylene diamine tetra(methylene phosphonic acid), hexamethylene diamine tetra(methylene phosphonic acid) and diethylene triamine penta(methylene phosphonic acid).

A processing aid, such as methyl methacrylate-based copolymer, may be added to improve the extrusion and thermoforming. In addition, silicone oils, oligomeric isobutylene or similar materials are suitable for use as additives. If used, the usual concentrations thereof are from 0.001 to 5% by weight.

Details concerning the preparation of the thermoplastic moulding compositions are as follows:

The graft polymers having bimodal particle size distribution are prepared by emulsion polymerization, as described above for component (A). As described above, suitable measures are taken in order to establish the bimodal particle size distribution, preference being given to (partially) agglomerating the polymer particles, as mentioned, by adding a polyacrylate dispersion which has agglomerating effect. Instead of this, or combined with the (partial) agglomeration, it is possible to use other suitable measures familiar to the person skilled in the art to establish the bimodal particle size distribution.

Component (A), the resultant dispersion of the graft polymer (A) is preferably worked up prior to the mixing with the components (B) to (E).

The dispersion of component (A) is generally worked up in a manner known per se. E.g., component (A) is firstly precipitated from the dispersion, for example by adding acids (such as acetic acid, hydrochloric acid or sulphuric acid) or salt solutions (such as calcium chloride, magnesium sulphate or alum) which can bring about precipitation, or else by freezing (freeze coagulation). The aqueous phase may be removed in a usual manner, for example by screening, filtering, decanting or centrifuging. This preliminary removal of the dispersion water gives polymers (A) which are moist with water and have a residual water content of up to 60% by weight, based on (A), where the residual water may, for example, either adhere externally to the polymer or else be enclosed within it.

After this, the polymer may, if required, be dried in a known manner, for example by hot air or using a pneumatic dryer. It is likewise possible to work up the dispersion by spray drying.

According to one embodiment of the invention, it was surprisingly found that the resulting moisture content of the worked-up component (A) should preferably 0 to 27% by weight, preferably 20 to 26% by weight, particularly 23 to 26% by weight.

The thermoplastic moulding composition (F) is produced by mixing components (A), (B) and (C) and, optionally (D) and/or (E) according to methods well known to those skilled in the art. Mixing can be carried out by any known method and in any desired manner. Preferably mixing is carried out in a mixing apparatus.

If one or more components are incorporated in the form of an aqueous dispersion or of an aqueous or non-aqueous solution, the water or the solvent is removed from the mixing apparatus, preferably an extruder, via a devolatilizing unit.

Examples of mixing apparatuses are discontinuously operating heated internal mixers with or without rams, continuously operating kneaders, such as continuous internal mixers, screw compounders having axially oscillating screws, Banbury mixers, and also extruders, roll mills, mixing rolls where the rolls are heated and calenders.

Preference is given to using an extruder as mixing apparatus. Single- or twin-screw extruders, for example, are particularly suitable for extruding the melt. A twin-screw extruder is preferred.

Blending of the components is preferably carried out by co extruding, kneading or roll-milling the components at temperatures of, preferably, from 180 to 400° C.

In a preferred embodiment the mixing of only components (A), (B) and, optionally, (E) is carried out by co extruding, kneading or roll-milling the components at temperatures of, preferably, from 180 to 400° C.

The so obtained granulate is then mixed with component (C) and if present (D) to produce moulding compositions (F). The compounding may be carried out by any known method and in any desired manner. However, blending of the components is preferably carried out by co extruding, kneading or roll-milling the components at temperatures of, preferably, from 180 to 400° C.

The moulding compositions can be processed to shaped articles, including films or fibers.

According to one embodiment of the invention, these can be prepared from moulding compositions (F), by known methods of processing thermoplastics. In particular, production may be effected by thermoforming, extruding, injection moulding, calendaring, blow moulding, pressing, pressure sintering, deep drawing or sintering, preferably by injection moulding.

The molded articles prepared from moulding compositions (F), can be used for several applications where improved adhesion for metal plating is desired.

After forming, the metal plating can likewise be accomplished by any number of procedures well known to those skilled in the art.

A number of commercial plastic plating techniques have been developed, and many of these are well known in the art. These include, for example, the so-called Enthone System (Enthone Inc., USA) and/or the Mac Dermid System (Mac Dermid, Inc., USA). Typically, however, wide variations in plating bath additives and the concentrations of such additives, as well as other significant differences exist within any single given system. For example, most of these commercial plating systems were originally designed for plating ABS compositions, and the number of modifications, such as changes in the concentrations in the components of the acid etching baths, must be made where these systems are employed in the plating of blends from ABS with (semi) cristalline polymers like PA or propylene.

Any platable metal can be used to plate the thermoplastic polymer of the current invention, which metals include, but are not limited to, copper, semi-bright nickel, copper or nickel strike, nickel, bright nickel, and chromium. The majority of compositions are plated with a copper/nickel/chromium electroplate. These finishes are seldom a single metal finish, usually they are two or more successive layers. In addition, one or more metal layers comprising one or more platable metals may be electro-deposited upon a plastic. Typically, layers may have a thickness from about 0.1 to 80 micrometers, preferably from about 0.15 to 70 micrometers, and even more preferably from about 0.2 to 60 micrometers. However, one of ordinary skill in the art would readily recognize that the choice of metal used and the thickness of the layer would depend on the desired application.

In the most preferred embodiment of the invention, the metallic coating is applied to the plastic item using the electroplating techniques widely used in automotive and sanitary industry.

The invention is further illustrated by the following examples and the patent claims.

EXAMPLES

1. Preparation of the Graft Polymer (A)

1.1. Preparation of the Graft Base ($a_1$)

The preparation of the graft base ($a_1$) was conducted on a production scale. The corresponding preparation can be scaled down by the following recipe:

Emulsion polymerizations were carried out in a 150 liter reactor at a constant temperature of 67° C. 43120 g of the monomer mixture given in Table 1 were polymerized at 67° C. in the presence of 431 g t-dodecyl mercaptane (TDM), 311 g of the potassium salt of $C_{12}$-$C_{20}$ fatty acids, 82 g of potassium peroxidisulfate, 147 g of sodium hydrogen carbonate and 58400 g of water, to give a polybutadiene latex. First styrene, which corresponds to 10 w % of the total amount of monomer in the recipe, was added in 20 minutes. After the styrene addition, the first part of the butadiene, which corresponds to 10 w % of the total amount of monomer in the recipe, was added in 25 minutes. The remaining part of the butadiene, which corresponds to 80 w % of the total amount of monomer in the recipe, was added in 8.5 hours. The TDM being added in one portion at the start of the reaction. The conversion was 95% or greater. The resulting dispersion had a mean particle size ($d_{50}$) of 110 nm. The gel content of the graft base ($a_1$) was 80 and the swelling index was 10.

To agglomerate the latex, 5265 g of the resultant latex, diluted to a TSC of 40%, is agglomerated (partial agglomeration) at 68° C. by adding 526.5 g of a dispersion (solids content 10% by weight) of 96% by weight of ethyl acrylate and 4% by weight of methacrylamide.

1.2. Preparation of the Graft ($a_2$).

The preparation of the graft ($a_2$) was conducted on a production scale. The corresponding preparation can be scaled down by the following recipe:

Component A1:

Following agglomeration, 20 g emulsifier (potassium-stearate) and 3 g initiator (potassium peroxidisulfate) were added. Water was added in an amount to set the total solid content of the dispersion after completion of the polymerization to a theoretical value of 40%. 74.7 g of acrylonitrite, 298.8 g of styrene were then added. A mixture of 224.1 g of acrylonitrile, 896.4 g of styrene was then added over a period of 190 minutes, the temperature being raised to 83° C. after over half of the time. On completion of the addition of monomer, 3 g initiator (potassium persulfate) was again added and the polymerization was continued for 60 minutes.

The resultant graft polymer dispersion, which had bimodal particle size distribution, had a mean particle size $d_{50}$ of from 150 to 350 nm and a $d_{90}$ of from 400 to 600 nm. The particle size distribution had a first maximum in the range from 50 to 150 nm and a second maximum in the range from 200 to 600 nm.

To the dispersion there were added 0.2% by weight of a stabilizer, based, in each case, on the total solids content, and the mixture was cooled and coagulated at ca. 60° C. in an aqueous 0.5% $MgSO_4$-solution followed by an aging step for 10 minutes at 100° C. Afterwards the slurry is cooled down, centrifuged and washed with water to obtain a graft polymer ($a_2$).

The resulting graft component A1 had a remaining moisture content of 27%.

Component A2:

The preparation of component A2 is identical to that for A1 except for the amounts of styrene and acrylonitrile. In the preparation of A2, 100.8 g acrylonitrile and 272.7 g styrene were added instead of 74.7 g and 298.8 g, respectively, after the dilution step. The subsequent monomer mixture added was a mixture of 302.5 g acrylonitrile and 818.0 g styrene instead of 224.1 g and 894.4 g, respectively.

The resulting graft component A2 had a remaining moisture content of 24%.

2. Preparation of the Polymers (B), and (C)

The thermoplastic polymers (B) and (C) were prepared by continuous solution polymerization, as described in Kunststoff-Handbuch, ed. R. Vieweg and G. Daumiller, Vol, V "Polystyrol", Carl-Hanser-Verlag, Munich, 1969, p. 122-124. Table 3 gives the formulations and properties.

TABLE 1

| Components (B) and (C) | | | |
|---|---|---|---|
| Component | B1 | B2 | C |
| Styrene [weight-%] | 74 | 67 | 74 |
| Acrylonitrile [weight-%] | 24 | 33 | 24 |
| Maleic anhydride [weight-%] | — | — | 2 |
| Viscosity number VN [ml/g] | 64 | 70 | 60 |

3. Preparation of the Blends

The preparation of the blends was conducted on a production scale. The corresponding preparation and process can be scaled down by the following description:

The graft rubber (A) containing residual water was metered into a Werner and Pfleiderer ZSK 30 extruder in which the front part of the two conveying screws were provided with retarding elements which build up pressure. A considerable part of the residual water was pressed out mechanically in this way and left the extruder in liquid form through water-removal orifices. The other components (B) and (E) were added to the extruder downstream behind the restricted flow zones, and intimately mixed with the dewatered component (A). The residual water still present was removed as steam via venting orifices in the rear part of the extruder. The extruder was operated at 250° C. and 250 rpm, with a throughput of 10 kg/h. The moulding composition was extruded and the molten polymer mixture was subjected to rapid cooling by being passed into a water bath at 25° C. The hardened moulding composition was granulated. This granulate was then compounded with component (C) and if present (D) and (E) on a normal ZSK 30 extruder at 250° C. and 250 rpm with a throughput of 10 kg/hour.

The components used and their constituent amounts in dry weight % are in Table 2.

TABLE 2

| Example | 1 (inv) | 2 (inv) | 3 (comp to 1) | 4 (comp to 2) |
|---|---|---|---|---|
| Component A1 | — | — | 30 | 30 |
| Component A2 | 30 | 30 | — | — |
| Component B1 | — | — | 70 | 68 |
| Component B2 | 70 | 68 | — | — |
| Component C | — | 2 | — | 2 |
| Component E | 0.3 | 0.3 | 0.3 | 0.3 |

* mixture of 0.1% silicon oil, 0.1% Wingstay ® L and 0.1% distearyldithiopropionate.

Sample Preparation:

Plagues were produced by injection moulding at conditions typical for ABS thermoplastics. The mould temperature was 120° F. The dimensions of the plagues were 4"×4" with a thickness of 3 mm.

Metal Plating Process:

The metal plating process is a standard metal plating technique analogue as described above.

The specimens were treated according to the most widely spread metal plating procedure in industry. All parameters of the procedure were according to the instructions of the manufacturer of the chemicals involved. The etching times and etching bad temperatures were equal for all specimens and were within the ranges widely used in industry. These conditions were selected in such a way that surface structure of the etched plagues had a comparable quality. Scanning electron microscopy is the method of choice to verify this structure of the surface after etching. After etching and pretreatment, the subsequent standard procedures (including the rinsing between the steps), i.e. copperplating, nickelplating and chromium plating was conducted. By doing so, the thickness of the metal layer so obtained is typical for metal plated articles (copper layer between 13 and 20 µm, Nickel layer between 21 and 26 µm).

Test:

Gravelometer Test:

In order to estimate the performance of the metal layer upon repeated impact, the metal plated plaques were subjected to a gravelometer. Details of such a gravelometer are described in the GM Worldwide Engineering Standard GMW 14700. All test specimens must be positioned at 90 degrees to the trajectory of the stones. Air is flow through the chamber. The gravel is fed to the air stream within an interval of 8+/−2 seconds. For the purpose of the evaluation of the effectiveness of our invention, each plaque was subjected 10 times to this procedure. The procedure was carried out at room temperature conditions.

For the purpose of evaluation the effectiveness of our invention, the plagues were visibly inspected for chips and defects. The total affected surface area was reported in $mm^2$.

Details of the Climate Shock:

The samples were placed in a freezer at −40° C. for one hour and subsequently within 1 minute placed into an adjacent oven at 93° C. This procedure is derived from GMW14668.

After the climate shock the samples were inspected for chips and defects. The total affected surface area was reported in $mm^2$.

The evaluation method of the resistance to repeated impact

For our evaluation it was important to judge the overall performance (Grav2). That means a weight evaluation of the performance before the climate shock (Grav0) and after the climate shock (Grav1). The overall performance of the gravelometer test (Grav2) is defined as follows:

$$Grav2, i = (Grav0, i/Grav0, ref + Grav1, i/Grav1, ref) * (\tfrac{1}{2}) * 100\%$$

Wherein "i" is the sample number and "ref" refers to the reference sample. The reference sample for the results in Table 3 is comparative example 1.

The smaller the value for Grav2, the better the overall performance. Grav0 is the number of defects of the metal plated material after the gravelometer test. The lower the value for Grav0, the better its performance in this property. Grav1 is the number of defects of the metal plated material after the gravelometer test and subsequent thermoshock cycles. The lower the value for Grav1, the better its performance in this property.

Results are shown in Table 3

|  | Example 1 (invention) | Example 2 (invention) | Comparative Example 1 (according to EP-A-1 940 950) (Gravelometer reference) |
|---|---|---|---|
| Component A1 | — | — | 30 |
| Component A 2 | 30 | 30 | |
| Component B1 | — | — | 70 |
| Component B2 | 70 | 68 | — |
| Component C | — | 2 | — |
| Component E* | 0.3 | 0.3 | 0.3 |
| Grav0 (mm$^2$) | 48 | 88 | 188 |
| Grav1 (mm$^2$) | 5000 | 768 | 5013 |
| Grav2 | 63% | 54% | 100% |

As can be concluded from the results in Table 3, the invention related samples 1 and 2 show an improved overall performance in the gravelometer test. Composition 1 according to the invention shows that the invention rubber results in a performance that is even better than the product described in EP-A 1 940 950. By including the compatibilizer the performance becomes even better.

The invention claimed is:

1. A thermoplastic moulding composition (F) comprising as components,
    A) from 10 to 70% by weight of a graft polymer (A) having a bimodal particle size distribution and a moisture content of 0 to 27% by weight, made, based on (A),
        $a_1$) from 40 to 90% by weight of an elastomeric particulate graft base ($a_1$), obtained by emulsion polymerization of, based on ($a_1$),
            $a_{11}$) from 70 to 100% by weight of at least one conjugated diene, or of at least one $C_{1-8}$-alkyl acrylate, or of mixtures of these,
            $a_{12}$) from 0 to 30% by weight of at least one other monoethylenically unsaturated monomer and
            $a_{13}$) from 0 to 10% by weight of at least one polyfunctional, cross linking monomer,
        $a_2$) from 10 to 60% by weight of a graft $a_2$), made, based on $a_2$),
            $a_{21}$) from 64 to 76% by weight of at least one vinyl aromatic monomer,
            $a_{22}$) from 24 to 36% by weight of acrylonitrile,
            $a_{23}$) from 0 to 30% by weight of at least one other monoethylenically unsaturated monomer, and
            $a_{24}$) from 0 to 10% by weight of at least one polyfunctional, cross linking monomer;
    B) from 20 to 88% by weight of a thermoplastic polymer (B) having a viscosity number VN of from 50 to 120 ml/g, made, based on (B),
        $b_1$) from 64 to 72% by weight of at least one vinyl aromatic monomer,
        $b_2$) from 28 to 36% by weight of acrylonitrile, and
        $b_3$) from 0 to 4% by weight of at least one other monoethylenically unsaturated monomer;
    whereby the difference of the acrylonitrile content in component (B) and that in the graft shell $a_2$) is minimal 2% by weight and maximal 6% by weight, and
    C) from 1.2 to 3% by weight of a thermoplastic polymer (C) having a viscosity number VN of from 50 to 120 ml/g, made, based on (C),
        $c_1$) from 64 to 76% by weight of at least one vinyl aromatic monomer,
        $c_2$) from 17 to 35% by weight of acrylonitrile and
        $c_3$) from 1 to 10% by weight of at least one other monoethylenically unsaturated monomer selected from dicarboxylic acids and their anhydrates,
    where the vinyl aromatic content of component (C) is larger than that of component (B);
    D) from 0 to 80% by weight of amorphous or (semi)-crystalline polymers; and
    E) from 0 to 50% by weight of additives E.

2. A thermoplastic moulding composition (F) according to claim 1, consisting of:
    A) from 10 to 70% by weight of a graft polymer (A) having a bimodal particle size distribution and a moisture content of 0 to 27% by weight, made, based on (A),
        $a_1$) from 40 to 90% by weight of an elastomeric particulate graft base ($a_1$), obtained by emulsion polymerization of, based on ($a_1$),
            $a_{11}$) from 70 to 100% by weight of at least one conjugated diene, or of at least one $C_{1-8}$-alkyl acrylate, or of mixtures of these,
            $a_{12}$) from 0 to 30% by weight of at least one other monoethylenically unsaturated monomer and
            $a_{13}$) from 0 to 10% by weight of at least one polyfunctional, cross linking monomer,
        $a_2$) from 10 to 60% by weight of a graft $a_2$), made, based on $a_2$),
            $a_{21}$) from 64 to 76% by weight of at least one vinyl aromatic monomer,
            $a_{22}$) from 24 to 36% by weight of acrylonitrile,
            $a_{23}$) from 0 to 30% by weight of at least one other monoethylenically unsaturated monomer, and
            $a_{24}$) from 0 to 10% by weight of at least one polyfunctional, cross linking monomer;
    B) from 20 to 88% by weight of a thermoplastic polymer (B) having a viscosity number VN of from 50 to 120 ml/g, made, based on (B),
        $b_1$) from 64 to 72% by weight of at least one vinyl aromatic monomer,
        $b_2$) from 28 to 36% by weight of acrylonitrile, and
        $b_3$) from 0 to 4% by weight of at least one other monoethylenically unsaturated monomer;
    whereby the difference of the acrylonitrile content in component (B) and that in the graft shell $a_2$) is minimal 2% by weight and maximal 6% by weight, and
    C) from 1.2 to 3% by weight of a thermoplastic polymer (C) having a viscosity number VN of from 50 to 120 ml/g, made, based on (C),
        $c_1$) from 64 to 76% by weight of at least one vinyl aromatic monomer,
        $c_2$) from 17 to 35% by weight of acrylonitrile and
        $c_3$) from 1 to 10% by weight of at least one other monoethylenically unsaturated monomer, where the vinyl aromatic content of component (C) is larger than that of component (B);

D) from 0 to 80% by weight of amorphous or (semi)-crystalline polymers; and

E) from 0 to 50% by weight of additives E.

3. A thermoplastic moulding composition (F) as claimed in claim 1, wherein the amount of component (C) is 2% by weight based on (F).

4. A thermoplastic moulding composition as claimed in claim 1, wherein the amount of the monoethylenically unsaturated monomer in component (C) is 2% by weight based on (C).

5. A thermoplastic moulding composition as claimed in claim 1, wherein the monoethylenically unsaturated monomer in component (C) is maleic anhydride.

6. A thermoplastic moulding composition as claimed in claim 1, wherein the conjugated diene ($a_{11}$) is butadiene.

7. A thermoplastic moulding composition as claimed in claim 1, in which the vinylaromatic monomer ($a_{21}$) and ($b_1$) and ($c_1$) is styrene or α-methylstyrene or a mixture of styrene and α-methylstyrene.

8. A thermoplastic moulding composition as claimed in claim 1, in which the graft ($a_2$) consists essentially of, based on ($a_2$), $a_{21}$) from 70 to 76% by weight of styrene and/or α-methylstyrene, $a_{22}$) from 24 to 30% by weight of acrylonitrile, and the thermoplastic polymer (B) consists essentially of, based on (B), $b_1$) from 64 to 72% by weight of styrene, $b_2$) from 28 to 36% by weight of acrylonitrile.

9. A thermoplastic moulding composition as claimed in claim 1, in which the monoethylenically unsaturated monomer ($a_{12}$) is styrene or n-butyl acrylate or a mixture of these.

10. A thermoplastic moulding composition as claimed in claim 1, in which the bimodal particle size distribution of the graft polymer (A) has two maxima, at particle sizes of from 25 to 200 nm and from 150 to 800 nm.

11. A process for producing a moulding composition (F) as claimed in claim 1, comprising the step of mixing:

A) from 10 to 70% by weight of a graft polymer (A) having a bimodal particle size distribution, made, based on (A);

$a_1$) from 40 to 90% by weight of an elastomeric particulate graft base ($a_1$), obtained by emulsion polymerization of, based on (a), $a_{11}$) from 70 to 100% by weight of at least one conjugated diene, or of at least one $C_{1-8}$-alkyl acrylate, or of mixtures of these $a_{12}$) from 0 to 30% by weight of at least one other monoethylenically unsaturated monomer and $a_{13}$) from 0 to 10% by weight of at least one polyfunctional, cross linking monomer, $a_2$) from 10 to 60% by weight of a graft ($a_2$), made, based on ($a_2$), $a_{21}$) from 64 to 76% by weight of at least one vinyl aromatic monomer, $a_{22}$) from 24 to 36% by weight of acrylonitrile, $a_{23}$) from 0 to 30% by weight of at least one other monoethylenically unsaturated monomer, and $a_{24}$) from 0 to 10% by weight of at least one polyfunctional, cross linking monomer;

B) from 20 to 88% by weight of a thermoplastic polymer B) having a viscosity number VN of from 50 to 120 ml/g, made, based on (B), $b_1$) from 64 to 72% by weight of at least one vinyl aromatic monomer, $b_2$) from 28 to 36% by weight of acrylonitrile, and $b_3$) from 0 to 4% by weight of at least one other monoethylenically unsaturated monomer;

and,

C) from 1.2 to 3% by weight of a thermoplastic polymer (C) having a viscosity number VN of from 50 to 120 ml/g, made, based on (C), $c_1$) from 64 to 76% by weight of at least one vinyl aromatic monomer, $c_2$) from 17 to 35% by weight of acrylonitrile, and $c_3$) from 1 to 10% by weight of at least one other monoethylenically unsaturated monomer selected from dicarboxylic acids and their anhydrates, where the vinyl aromatic content of component (C) is larger than that of component (B);

D) from 0 to 80% by weight of amorphous or (semi)-crystalline polymers; and

E) from 0 to 50% by weight of additives E.

12. The process as claimed in claim 11, where in a first step, the components (A), (B), and (E) are mixed by co-extruding, kneading or roll-milling the components at temperatures of from 180 to 400° C., and in a second step, the granulate obtained in the first step (i) is then mixed with components (C), (D) and (E).

13. A moulding produced from a thermoplastic moulding composition as claimed in claim 1.

14. A method of use of a thermoplastic moulding composition (F), as claimed in claim 1 for producing metal plated mouldings.

15. A method of producing a metal plated moulding comprising the step of coating a moulding as claimed in claim 13 with a metal.

16. A process for producing a metal plated moulding, comprising the steps of

I. mixing:

A) from 10 to 70% by weight of a graft polymer (A) having a bimodal particle size distribution, made, based on (A), $a_1$) from 40 to 90% by weight of an elastomeric particulate graft base ($a_1$), obtained by emulsion polymerization of, based on ($a_1$), $a_{11}$) from 70 to 100% by weight of at least one conjugated diene, or of at least one $C_{1-8}$-alkyl acrylate, or of mixtures of these, $a_{12}$) from 0 to 30% by weight of at least one other monoethylenically unsaturated monomer and $a_{13}$) from 0 to 10% by weight of at least one polyfunctional, cross linking monomer, $a_2$) from 10 to 60% by weight of a graft ($a_2$), made, based on ($a_2$), $a_{21}$) from 65 to 95% by weight of at least one vinyl aromatic monomer, $a_{22}$) from 5 to 35% by weight of acrylonitrile, $a_{23}$) from 0 to 30% by weight of at least one other monoethylenically unsaturated monomer, and $a_{24}$) from 0 to 10% by weight of at least one polyfunctional, cross linking monomer;

B) from 20 to 88% by weight of a thermoplastic polymer (B) having a viscosity number VN of from 50 to 120 ml/g, made, based on (B), $b_1$) from 74 to 78% by weight of at least one vinyl aromatic monomer, $b_2$) from 22 to 26% by weight of acrylonitrile, and $b_3$) from 0 to 30% by weight of at least one other monoethylenically unsaturated monomer; and C) from 1.2 to 3% by weight of a thermoplastic polymer (C) having a viscosity number VN of from 50 to 120 ml/g, made, based on (C), $c_1$) from 64 to 76% by weight of at least one vinyl aromatic monomer, $c_2$) from 17 to 35% by weight of acrylonitrile and $c_3$) from 1 to 10% by weight of at least one other monoethylenically unsaturated monomer selected from dicarboxylic acids and their anhydrates, where the vinyl aromatic content of component (C) is larger than that of component (B);

D) from 0 to 80% by weight of amorphous or (semi)-crystalline polymers; and

E) from 0 to 50% by weight of additives E;

II. processing the obtained thermoplastic moulding composition (F) into a moulding having the desired form, and III. coating the obtained moulding with a metal.

17. A metal coated moulding produced from a thermoplastic moulding composition (F) as claimed in claim 1.

* * * * *